United States Patent

[11] 3,551,700

[72] Inventor Richard E. Greenan
Sunnyvale, Calif.
[21] Appl. No. 678,810
[22] Filed Oct. 30, 1967
[45] Patented Dec. 29, 1970
[73] Assignee Uthe Technology, Inc.
Mountain View, Calif.
a corporation of California

[54] SOLID-STATE LINE VOLTAGE SWITCH
1 Claim, 2 Drawing Figs.

[52] U.S. Cl. .......... 307/252, 307/305
[51] Int. Cl. .......... H03k 17/00
[50] Field of Search .......... 307/247, 252, 305

[56] References Cited
UNITED STATES PATENTS

| | | | |
|---|---|---|---|
| 3,397,344 | 8/1968 | Skirpan | 307/252X |
| 3,438,023 | 4/1969 | Apitz | 307/252X |
| 3,456,133 | 7/1969 | Warren | 307/305 |
| 3,458,726 | 7/1969 | Webb | 307/252 |

*Primary Examiner*—Donald D. Forrer
*Assistant Examiner*—R. C. Woodbridge
*Attorney*—Limbach, Limbach & Sutton

ABSTRACT: A solid-state line voltage switch is disclosed for on-off control of AC power sources wherein a pair of one-way semiconductor switches are coupled back-to-back in parallel across the lines of the power source and in series with the load and wherein the gates of the one-way semiconductor switches are controlled by a signal derived from a small signal AC voltage generator operating in the low frequency range, amplified and put through a signal divider to the respective gates of the semiconductor switches.

INVENTOR.
RICHARD E. GREENAN
BY
Townsend and Townsend
ATTORNEYS

SOLID-STATE LINE VOLTAGE SWITCH

FIELD OF THE INVENTION

This invention relates to a new and improved solid-state line voltage control switch, and in particular to an on-off switch for precision control of AC power sources.

DESCRIPTION OF THE PRIOR ART

The starting requirements and turnoff characteristics of many electrical machines and components place a heavy demand on line voltage switches controlling the power to such machines and components. For instance, high current requirements during starting and high-voltage pulses on turnoff under inductive loads burn the physical contacts of conventional switches leading to failure over a period of time. Furthermore, contact resistance and contact bounce between the physical contacts produce transient voltages and imprecise and unreliable turn-on and turnoff.

Solid state switches heretofore developed to overcome these problems have been found deficient for reliable and precise turnoff when used with inductive loads. Furthermore, present circuit arrangements used to trigger the solid state switches tend to produce a hysteresis effect in the turn-on and turnoff of the switch. Other problems include excessive R.F. interference.

SUMMARY OF THE INVENTION

It is the object of the present invention to provide a solid-state line voltage switch for precision control of AC power sources having reliable turnoff, low R.F. interference, and which eliminates hysteresis effect in turn-on and turnoff. The invention is further intended to provide a switch with no moving parts in the power line to eliminate contact resistance and contact bounce and provide long life in excess of the life of the machines or components with which it is to be used.

In order to accomplish these results, the present invention contemplates the provision of two back-to-back one-way semiconductor switches coupled in parallel across an AC power source and in series with the load to which the AC power is to be turned on and off. The invention further contemplates controlling the respective gates of the one-way semiconductor switches by a signal derived from a small signal AC voltage generator or oscillator operating in the low frequency range, amplified and put through a signal divider to the respective gates of the one-way semiconductor switches. When the small signal AC voltage generator or oscillator is turned on the one-way semiconductor switches are triggered and maintained in the conducting state so that the line voltage appears across the load. When the generator is turned off, the semiconductor switches become nonconducting, the full line voltage appearing across the semiconductor switches. The small signal AC voltage generator or oscillator may be conveniently controlled by a timer switch, thermoswitch or other conventional switch because of the small power of the signal at the oscillator.

Other objects of the present invention will become apparent as the following specification progresses, reference being had to the accompanying drawings for an illustration of a preferred embodiment of the invention.

DESCRIPTION OF THE PREFERRED EMBODIMENT

Figure 1:
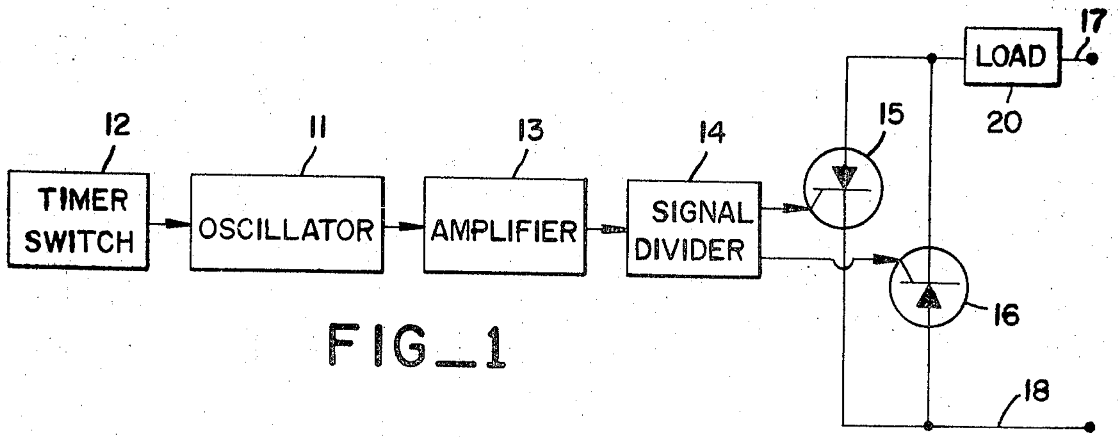
FIG. 1 is a block diagram showing generally a solid-state switch embodying the present invention.

In the embodiment of the present invention illustrated in FIG. 1, there is provided generally a small signal AC voltage generator or oscillator 11 controlled by a timer switch 12. The output of the oscillator is amplified by a small signal amplifier 13 and divided into two signals by a signal divider 14. The two signals are coupled respectively to the gates of two one-way semiconductor switches 15, 16 which are connected back-to-back and in parallel across the lines 17 and 18 of a 115 volt 60 cycle AC power source and in series with the load 20. Thus, semiconductor switch 15 is coupled with the anode at line 17 and cathode at line 18, while semiconductor switch 16 is coupled with the cathode at line 17 and the anode at line 18.

The one-way semiconductor switches in the illustrated embodiment are silicon-controlled rectifiers (SCR), conducting in one direction when a signal is applied to the gate of the SCR. Each SCR is chosen to have a breakdown voltage well in excess of the line voltage to be switched on and off so that the SCR is triggered into the conducting state by the gate signal only. The gate signal derived from the oscillator is in the low frequency range, 30 kc. to 300 kc. and preferably about 60 kc. so that the SCR's are maintained in a substantially continuous conducting state when the oscillator is turned on by the timer switch 12. The line current through lines 17 and 18 is limited only by the maximum current capacities of the SCR's.

Figure 2:
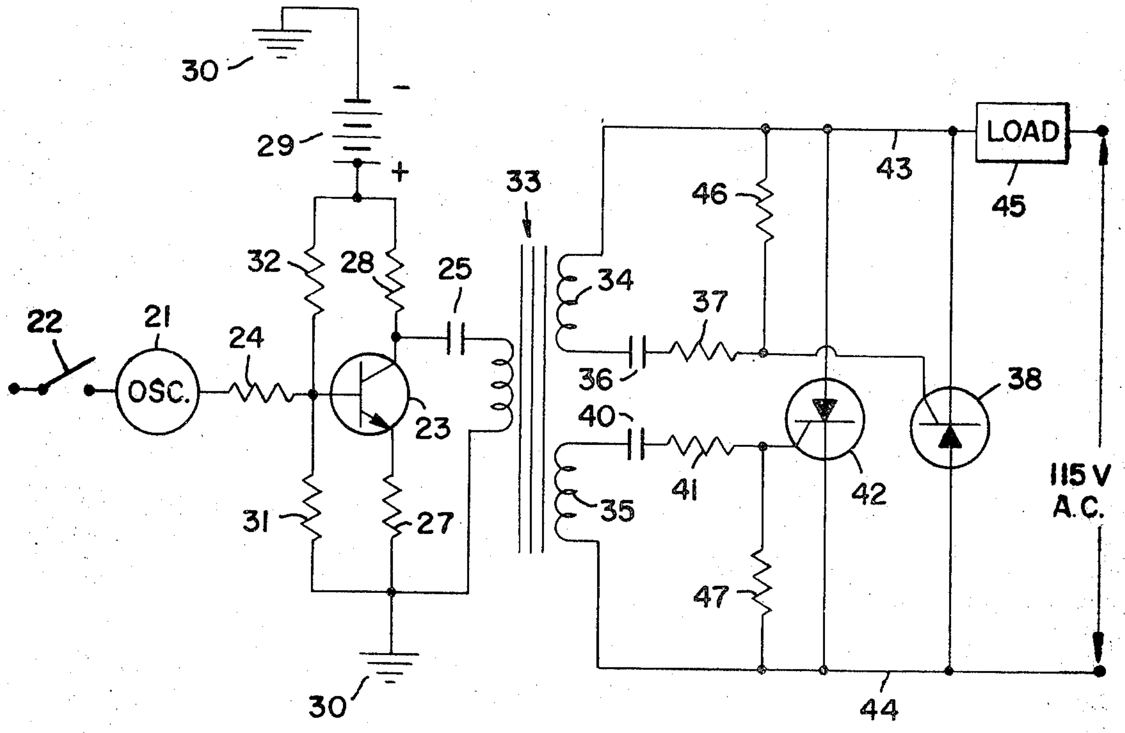
FIG. 2 is a schematic diagram of one circuit for the solid-state switch shown in FIG. 1.

In the circuit shown schematically in FIG. 2, the output of the oscillator 21, controlled by a conventional switch 22, is amplified by a small signal transistor amplifier stage comprising a transistor 23 connected in a common emitter circuit for high current gain. Thus, the input to the amplifier stage from oscillator 21 is through coupling resistor 24 to the base emitter side of transistor 23 while the output is derived from the collector-emitter side of transistor 23 through capacitor 25, transformer primary winding 26, and resistor 27. Capacitor 25 blocks the DC bias voltage and resistor 27 stabilizes the emitter current.

Bias voltage for the collector-emitter circuit is supplied by a single DC voltage source 29 having a positive terminal connected through resistor 28 to the collector of transistor 23 and a negative terminal connected through the common ground 30 to the emitter through resistor 27. Bias voltage to the base emitter side is provided by connecting resistor 31 between the base of transistor 23 and negative terminal of DC voltage source 29, and resistor 32 connected between the base of transistor 23 and positive terminal of DC voltage source 29.

The output from the small signal amplifier through the primary winding 26 of a transformer 33 such as a Triad T-35*x* transformer is divided into signals in the secondary windings 34 and 35. The signal in secondary winding 34 is fed through capacitor 36 and resistor 37 to the gate of SCR 38 on one side and to the cathode of SCR 38 on the other side while the signal in secondary winding 35 is fed through capacitor 40 and resistor 41 to the gate of SCR 42 on one side and the cathode of SCR 42 on the other side. Capacitors 36 and 40 block DC and very low frequency current.

SCR's 38 and 42 are coupled in parallel, back-to-back across the lines 43 and 44 of a 115 volt 60 cycle AC power source and in series with the load 45. Hold down resistors 46 and 47 connected respectively between the gates of SCR's 38 and 42 and the cathodes of SCR's 38 and 42 are provided to prevent transient low energy high voltage pulses due to the transformer coupling from triggering the SCR's while in the nonconducting state. A voltage clipper or capacitor may also be coupled across the SCR's if required to keep transient voltages in the power line below the SCR breakdown voltages.

With the oscillator turned off, the SCR's are nonconducting, and the full 115 volts of the 60 cycle AC power source appears across the SCR's. When the oscillator is turned on, operating at 60 kc., a 60 kc. signal appears at the gate of each SCR and the SCR's become conducting. The full line voltage of 115 volts then appears across the load.

During any particular half-cycle of the 60 cycle AC power through one of the SCR's, 1,000 pulses will appear at the gate of that SCR. Once an SCR becomes conducting during any half-cycle, it remains conducting for the completion of the half-cycle because of the current through the SCR in excess of the holding current necessary to maintain the SCR in the conducting state. Only at the beginning of each half-cycle could an SCR turn off, and because of 1,000 pulses at the gate during any half-cycle, the turnoff would be for only one one-thousandths of a half-cycle. Thus, the SCR's are substantially continuously conducting with the oscillator turned on. By operating the oscillator in the low frequency range of 30 kc. to 300 kc., such substantially continuous conduction is possible. As a result, R.F. interference is a negligible factor.

The switch 22 controlling the oscillator may be a conventional type of switch because of the small signal power involved. The switch might be a timer switch for accurately and precisely cutting off at the AC power source or a thermoswitch or other control may be used. Shutoff occurs within one-half a cycle of the AC power source.

The embodiment of the invention described herein may be used to control power sources up to 115 volt AC Modification for handling higher voltages would be apparent to anyone skilled in the art. The maximum line current is limited only by the current capacities of the SCR's.

The present invention is particularly applicable where accurate and reliable shutoff is required as in the control of bonder motors during ultrasonic welding. While the embodiment of the invention disclosed herein has been described in a manner sufficient for a person skilled in the art, the values of components for one particular application used successfully to control a bonder motor in ultrasonic welding are set forth by way of example in the following table.

| Component: | Value |
|---|---|
| 24 | 10K. |
| 25 | 0.1K. |
| 27 | 22. |
| 28 | 2.7K. |

| Component: | Value |
|---|---|
| 31 | 10K. |
| 32 | 100K. |
| 36 | 0.1uf. |
| 37 | 1K. |
| 40 | 0.1uf. |
| 41 | 1K. |
| 46 | 10K. |
| 47 | 10K. |

Although the foregoing invention has been described in some detail by way of illustration and example for purposes of clarity of understanding, it is understood that certain changes and modifications may be practiced within the spirit of the invention as limited only by the scope of the appended claims.

I claim:

1. 1. A solid-state line voltage switch comprising: first and second silicon-controlled rectifiers coupled back-to-back in parallel across the lines of a power source to be controlled; a small signal AC voltage generator operating in the low frequency range; means for amplifying the small signal from said generator including a transistor amplifier stage connected in a common emitter circuit; a transformer having a primary winding coupled to the output of said amplifier stage and first and second secondary coils coupled respectively to the gate and cathode of said first and second silicon-controlled rectifiers; and first and second coupling means coupling said first and second secondary windings to said first and second silicon-controlled rectifiers, each including capacitance and resistance in series whereby direct current and very low frequency current from the power source to be controlled are blocked from the coupling means.